US008878778B2

(12) United States Patent  
Hirota (10) Patent No.: US 8,878,778 B2  
(45) Date of Patent: Nov. 4, 2014

(54) INFORMATION PROCESSING APPARATUS, AND CONTROL METHOD AND PROGRAM THEREFOR

(75) Inventor: Yuichiro Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 13/417,707

(22) Filed: Mar. 12, 2012

(65) Prior Publication Data

US 2012/0235897 A1 Sep. 20, 2012

(30) Foreign Application Priority Data

Mar. 15, 2011 (JP) ................................. 2011-056808

(51) Int. Cl.
*G09G 5/00* (2006.01)
*H04N 1/00* (2006.01)
*G06F 3/0482* (2013.01)

(52) U.S. Cl.
CPC .. *H04N 1/00458* (2013.01); *G06F 2203/04806* (2013.01); *G06F 3/0482* (2013.01)
USPC ....................................................... 345/156

(58) Field of Classification Search
None
See application file for complete search history.

(56) References Cited

U.S. PATENT DOCUMENTS 8,564,624 B2 * 10/2013 Doi ............................... 345/635
2006/0090141 A1 4/2006 Loui 2010/0110228 A1* 5/2010 Ozawa et al. ............... 348/231.2
2010/0214442 A1* 8/2010 Uemura et al. ............. 348/231.2
2011/0007094 A1* 1/2011 Nash et al. ..................... 345/634
2012/0162249 A1* 6/2012 Tsuda et al. ................... 345/629

FOREIGN PATENT DOCUMENTS

| CN | 101107668 A | 1/2008 |
| CN | 101512473 A | 8/2009 |
| CN | 101727285 A | 6/2010 |
| JP | 10-233985 A | 9/1998 |
| JP | 2009-014902 A | 1/2009 |
| JP | 2009-186899 A | 8/2009 |
| JP | 2009-217828 A | 9/2009 |
| JP | 2011-028643 A | 2/2011 |

* cited by examiner

*Primary Examiner* — Joseph Haley
*Assistant Examiner* — Emily Frank
(74) *Attorney, Agent, or Firm* — Canon USA, Inc. IP Division

(57) ABSTRACT

One of the aspects of the disclosure is directed to displaying an image according to attribute information thereof in a display area having a time axis based on an item of predetermined attribute information, and when changing a display range on the time axis, allowing a user to easily designate a point to be a reference thereof. An information processing apparatus according to the present invention displays an image in the display area having the time axis according to date and time information of the image. The information processing apparatus moves a mouse cursor on the display area according to a user's operation, and sets a reference after the display range is changed.

7 Claims, 8 Drawing Sheets

INFORMATION PROCESSING APPARATUS, AND CONTROL METHOD AND PROGRAM THEREFOR

BACKGROUND OF THE INVENTION

1. Field of the Invention

The present invention relates to a technique for displaying content information, such as an image on a screen, according to attribute information thereof.

2. Description of the Related Art

Conventionally, when changing a display range in a display area, a user designates a reference point by operating a pointing device to move a mouse cursor over the display area.

However, in a case where an image is arranged on the display area, the display area under the image is hidden, so that it is difficult for the user to move the mouse cursor to a desired point.

SUMMARY OF THE INVENTION

One of the aspects of the present invention is directed to a technique for displaying an image according to attribute information thereof on a display area based on a predetermined item of the attribute information, and when a display range of the display area is changed, allowing a user to easily designate a point to be a reference point thereof.

According to an aspect of the present invention, an information processing apparatus includes a display unit configured to display an image on a display area having a time axis according to photo shooting time of the image, a designation unit configured to designate a point on the display area in response to a user's operation, and a changing unit configured to change a display range of the time axis, wherein the changing unit, if the image is displayed at the designated point, changes the display range using the photo shooting time of the image as a reference, and if the image is not displayed at the designated point, changes the display range using time on the time axis corresponding to the designated point as a reference.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. Constituent elements set forth in the exemplary embodiments are not intended to limit the scope of the present invention.

Figure 1:
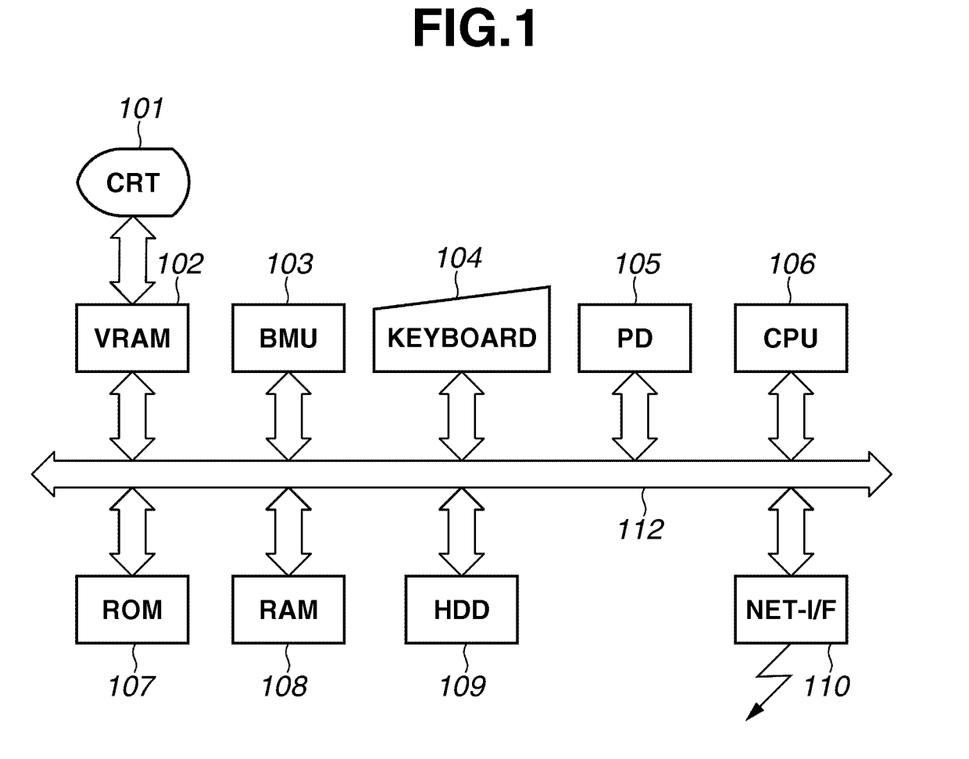
FIG. 1 is a block diagram illustrating an example of a configuration of an information processing apparatus according to an exemplary embodiment of the present invention.

First, a configuration of a computer apparatus that realizes an information processing apparatus according to a first exemplary embodiment will be described with reference to FIG. 1. A display device 101 displays data which is stored in and/or supplied from an information processing apparatus 100. For example, the display device 101 displays a display area which is drawn in a window of an information management application program according to the present exemplary embodiment. The display device 101 may be a liquid crystal display, a cathode-ray tube (CRT) display, or the like.

A video random access memory (VRAM) 102 stores image data to be displayed on the display device 101. The image data stored in the VRAM 102 is transferred to the display device 101 in accordance with a predetermined specification, and accordingly the image data is displayed on the display device 101. A bit move unit (BMU) 103 controls data transfer between memories (such as the VRAM 102 and other memories), or data transfer between the memories and respective input/output (I/O) devices (e.g., a network interface (I/F) 110).

A keyboard 104 includes various keys for enabling the user to input character string data or the like and to issue an instruction. A pointing device (PD) 105 is used by the user to operate a mouse cursor on the display area displayed on the display device 101.

A control unit 106 is a central processing unit (CPU) or the like. The control unit 106 controls each device connected to the control unit 106 based on a control program stored in a read only memory (ROM) 107, or a hard disk (HDD) 109. The ROM 107 stores data pieces of various control programs or the like. A random access memory (RAM) 108 includes a work area for the control unit 106, a save area of data during error processing, a loading area of the control programs, and so forth.

The HDD 109 stores various control programs or operating systems (OSs) executed by the control unit 106, content information such as image files or audio files, information management application programs, information concerning maps, and so forth. The network interface 110 is used to connect the devices to a network line such as the Internet. In the present exemplary embodiment, the image files are described being stored in the HDD 109. However, in a case of communicating with another information processing apparatus via the network interface 110 to get access thereto, the present embodiment can be similarly realized. A CPU bus 112 which enables the devices 101 to 110 to communicate with each other, may include an address bus, a data bus, and a control bus.

The information processing apparatus 100 may be realized by a single computer apparatus, or may be realized by distributing functions to a plurality of computer apparatuses as needed. When the information processing apparatus 100 includes the plurality of computer apparatuses, the computer apparatuses are connected via a local area network (LAN) or the like so that they can communicate with each other.

Figure 2:
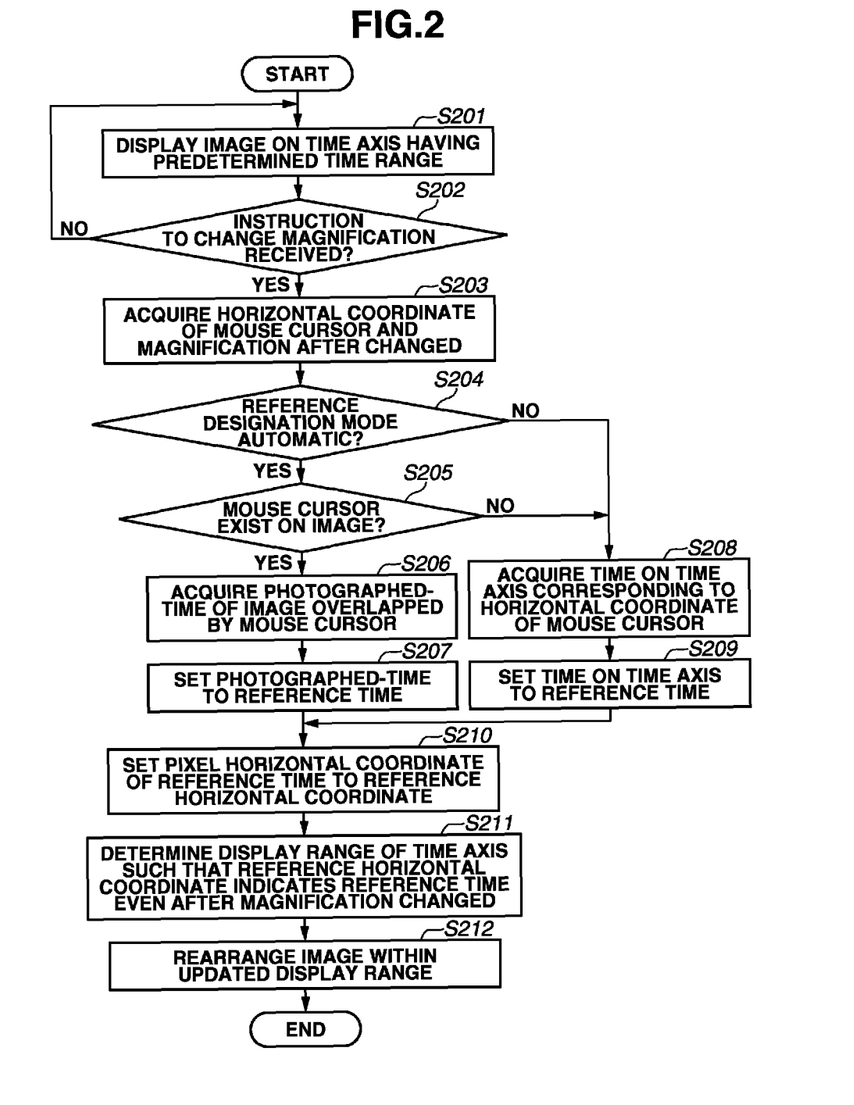
FIG. 2 is a flowchart illustrating an example of an operation of the information processing apparatus according to the exemplary embodiment of the present invention.

Next, an operation performed by the information processing apparatus 100 according to the present exemplary embodiment to display an image on a display area with a time axis based on photo shooting time included in attribute information thereof will be described with reference to FIG. 2. The operation is started and realized by the control unit 106 activating an information management application program (hereinafter, information management application) in response to a user's operation, and operating in accordance with the OS and information management application.

First, in step S201, the control unit 106 reads out an image file from the HDD 109, and displays a thumbnail image of the image file on a display area having a predetermined display range according to photo shooting time information of the image file. Then, in step S202, the control unit 106 determines whether an instruction to change the display range is received. When the user moves the mouse cursor over the display area by a drag operation using the PD 105, and executes a predetermined operation such as double clicking, the control unit 106 determines that the instruction to change the display range is received.

Further, if only, for example, double clicking operation is executed, the control unit 106 determines it as an enlargement instruction to change the display range narrower than the current display range. Further, if not only double clicking but also a press operation of a shift key are executed at the same time using the keyboard 104, the control unit 106 determines it as a reduction instruction to change the display range wider than the current display range. In other words, in step S202, the control unit 106 detects a content of the user's operation, and determines presence or absence of an instruction to change the display range based on a detection result.

If the control unit 106 receives the instruction to change the display range (YES in step S202), then in step S203, the control unit 106 acquires a horizontal coordinate of the mouse cursor on the display area and a magnification after the change. The magnification after the change can be calculated from displacement from start to end points of a drag operation of the mouse cursor. Alternatively, it may be defined in advance that, for example, it will be magnified two times (200%) when the mouse is double clicked. In other words, the magnification after the change is calculated based on the user's operation content which is detected when the instruction to change the display range is received.

In step S204, the control unit 106 determines whether a reference designation mode is automatic. In this case, if the user performs a predetermined operation such as a press operation of a control key together with, for example, the drag operation, the control unit 106 determines that the reference designation mode is manual.

If the mode is determined as automatic (YES in step S204), in step S205, the control unit 106 detects whether a thumbnail image exists at the coordinate indicated by the mouse cursor acquired in step S203 in the display area. If the mouse cursor exists over the thumbnail image (YES in step S205), in step S206, the control unit 106 acquires the photo shooting time of the image file corresponding to the thumbnail image. Then in step S207, the control unit 106 sets the photo shooting time as reference time.

On the other hand, if the reference designation mode is not automatic and regarded as manual (NO in step S204), or if the thumbnail image does not exist at the coordinate indicated by the mouse cursor (NO in step S205), in step S208, the control unit 106 acquires time on the time axis corresponding to the horizontal coordinate of the mouse cursor. Then, in step S209, the control unit 106 sets the time acquired in step S208 as the reference time.

In step S210, the control unit 106 stores a pixel horizontal coordinate on the display area corresponding to the set reference time as a reference horizontal coordinate. In step S211, the control unit 106 determines the display range based on the magnification after the change such that the reference horizontal coordinate indicates the reference time which remains unchanged before and after the change of the display range. In step S212, the control unit 106 rearranges the thumbnail image of the image file having the photo shooting time within the updated display range on the time axis.

Figure 3A:
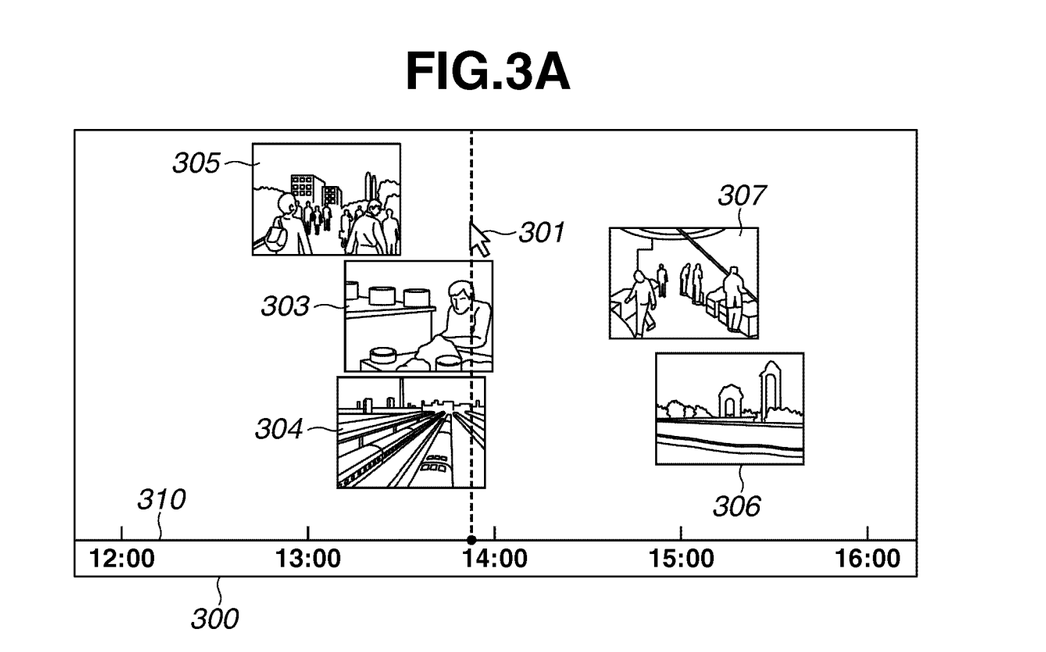
FIGS. 3A and 3B illustrate examples of display areas according to the exemplary embodiment of the present invention.

FIG. 3A illustrates a state when a thumbnail image does not exist at the coordinate indicated by the mouse cursor in step S205, and when the reference designation mode is manual in step S204. In FIG. 3A, the display range of a display area 300 is from 11:45 to 16:15, and thumbnail images 303 to 307 are displayed such that the center of gravity of each thumbnail image is placed on a horizontal coordinate corresponding to the photo shooting time of the image file thereof. A mouse cursor 301 exists at a coordinate at which it does not overlap with any thumbnail image. The horizontal coordinate of the mouse cursor 301 is assumed to indicate 13:53 on a time axis 310.

Figure 3B:
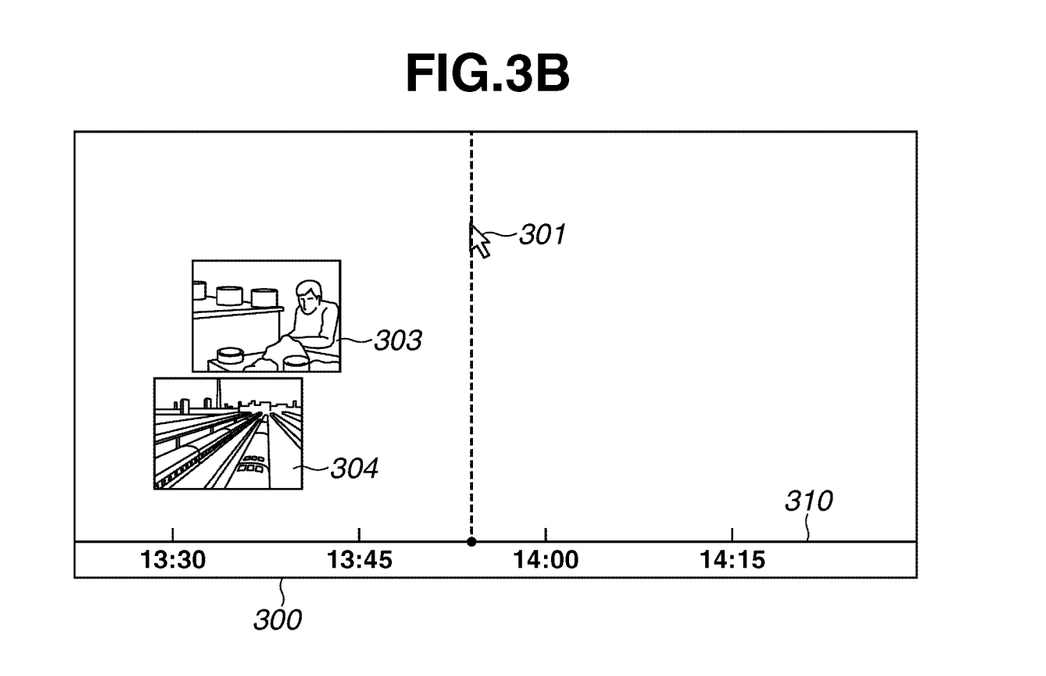

FIG. 3B illustrates a state in which the display range is changed from the state in FIG. 3A. In FIG. 3B, the display range of the display area 300 is from 13:23 to 14:29, and the display range is narrower as compared with that in FIG. 3A, it will be displayed in an enlarged form. Although the thumbnail images 303 and 304 included in the changed display range are displayed, the thumbnail images 305 to 307 outside of the display range are not displayed.

Further, the mouse cursor 301 in FIG. 3B exists at the horizontal coordinate of the reference time 13:53 on the time axis 310, which is the same as the horizontal coordinate on the time axis 310 of the mouse cursor 301 in FIG. 3A. In other words, in step S211, the control unit 106 determines the display range of the time axis such that the horizontal coordinate of the mouse cursor 301 and the corresponding time remain unchanged before and after the display range is changed.

Figure 4A:
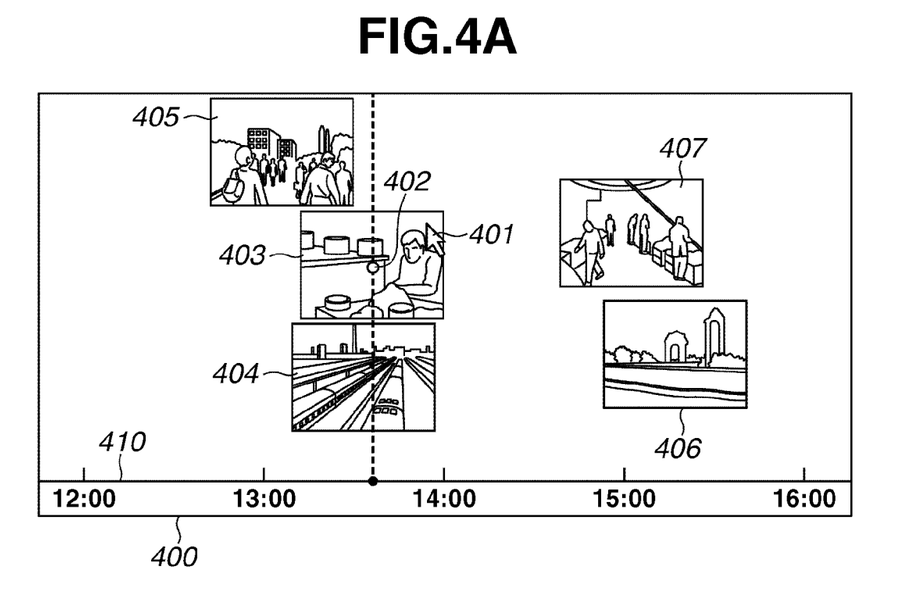
FIGS. 4A and 4B illustrate examples of display areas according to the exemplary embodiment of the present invention.

FIG. 4A illustrates a state when thumbnail images exist at the coordinate indicated by the mouse cursor in step S205. In FIG. 4A, a display range of a display area 400 is 11:45 to 16:15, and thumbnail images 403 to 407 are displayed such that the center of gravity of each thumbnail image is placed on the horizontal coordinate corresponding to the photo shooting time of the image file thereof. Since a mouse cursor 401 exists at the coordinate which overlaps with the thumbnail image 403, the photo shooting time of the image file 13:35 corresponding to the thumbnail image 403 is set as reference time.

Figure 4B:
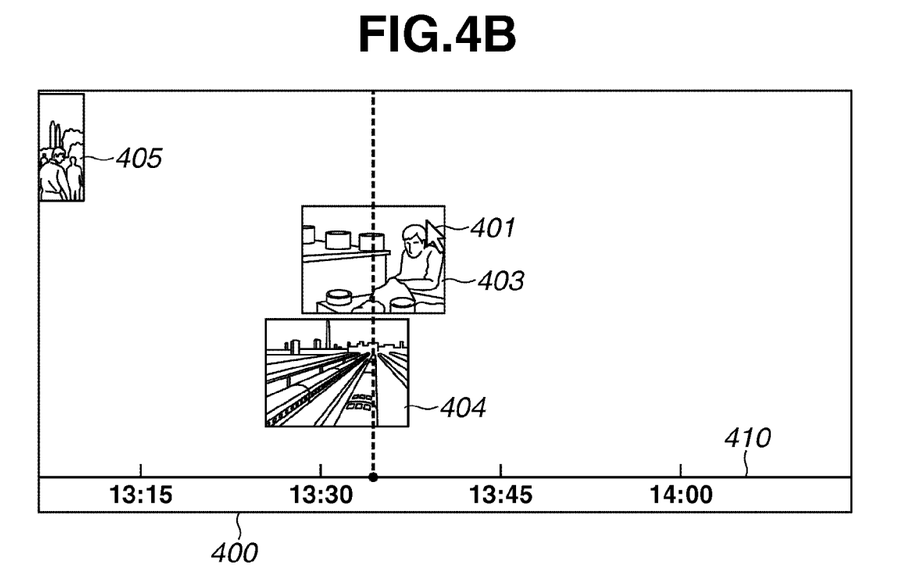

FIG. 4B illustrates a state in which the display range is changed from the state in FIG. 4A. In FIG. 4B, since the display range of the display area 400 is from 13:08 to 14:14, and the display range is narrower as compared with that in FIG. 4A, the display area 400 will be displayed in an enlarged form. The thumbnail images 403 to 405 included in the changed display range are displayed, but the thumbnail images 406 and 407 outside of the display range are not displayed. The center of gravity of the thumbnail image 403 overlapped with the mouse cursor 401 in FIG. 4B exists at the horizontal coordinate of the reference time 13:35 on the time axis, which is the same as the horizontal coordinate of the center of gravity of the thumbnail image 403 in FIG. 4A.

In other words, in step S211, the control unit 106 updates the display range of the time axis such that the horizontal coordinate of the center of gravity of the thumbnail image 403 overlapped with the mouse cursor 401 and the corresponding photo shooting time remain unchanged before and after the display range is changed. Further, the mouse cursor 401 also maintains a positional relationship with respect to the horizontal coordinate within the overlapped thumbnail image 403, before and after the change of the display range. Thus, a pixel horizontal coordinate of the mouse cursor 401 remains unchanged before and after the change of the display range of the time axis.

In step S210, the control unit 106 determines the display range such that the position of the mouse cursor in the display area remains unchanged before and after the display range is changed. Accordingly, the user does not need to move a viewpoint, and can continue to check an image or a point on which the user focuses before the change.

However, how to determine the display range is not limited to the above-described manner. In step S210, the control unit 106 may determine the display range such that the position of the mouse cursor coincides with the center of the display area after changed. Accordingly, the user can make a check centering around a point on which the user focuses after the display range changed.

In FIGS. 3A to 4B, the thumbnail images are arranged at locations corresponding to the photo shooting time of the image files in the horizontal direction of the time axis, however they are arranged at random in the vertical direction of the time axis. Accordingly, the thumbnail images can be displayed by being staggered in the vertical direction such that the thumbnail images of the image files with close photo shooting time do not overlap each other, which allows the user to easily confirm the thumbnail images.

Further, FIGS. 3A to 4B illustrate how the thumbnail images are displayed such that the center of gravity of each thumbnail image is placed on a position on the time axis corresponding to the photo shooting time of the image file thereof. However, the method for arranging the thumbnail image on the time axis is not limited to the above-described manner. Each thumbnail image may be displayed at a position on the time axis where a left edge or a right edge of the thumbnail image corresponds to the photo shooting time of the image file thereof.

Figure 5:
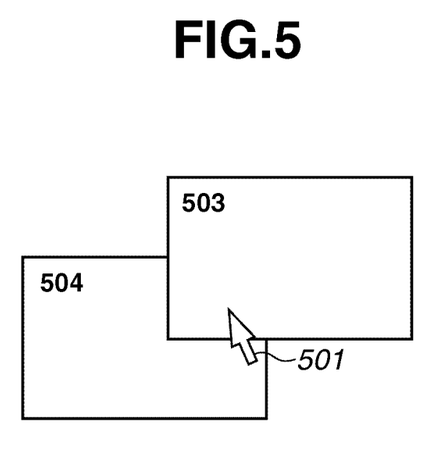
FIG. 5 illustrates an example of an overlap of images according to the exemplary embodiment of the present invention.

In step S206, if a mouse cursor 501 exists in an area where a plurality of thumbnail images 503 and 504 overlaps with each other as illustrated in FIG. 5, the control unit 106 acquires photo shooting time of the image file of the thumbnail image 503 which is present on the forefront among the plurality of thumbnail images. Alternatively, the control unit 106 may acquire photo shooting time of the image files of the respective thumbnail images 503 and 504, and acquire a middle point thereof as the photo shooting time.

A case in which movement of the mouse cursor on the display area is realized by the user's operation of the PD 105 is described above. However, how to move the mouse cursor is not limited to this method. The mouse cursor may be moved by providing a touch panel on the display device 101, and by the user touching the display device 101 with a finger.

If the user moves the mouse cursor over a thumbnail image, the user is likely to focus on the thumbnail image. However, since the thumbnail image is displayed, it is difficult for the user to move the mouse cursor to the coordinate on the time axis corresponding to the photo shooting time of the thumbnail image.

In view of such situation, according to the above-described present exemplary embodiment, when the mouse cursor is present over the thumbnail image, the photo shooting time of the image file corresponding to the thumbnail image is set as the reference. Accordingly, if the user wants to set photo shooting time corresponding to a desired thumbnail image as the reference, the user only needs to move the mouse cursor on the thumbnail image. As a result, the operation can be easier as compared to moving the mouse cursor exactly to a point corresponding to the photo shooting time.

On the other hand, if the user moves the mouse cursor to a coordinate where the thumbnail image does not exist, the user is likely to be interested in the time corresponding to the horizontal coordinate of the mouse cursor. Therefore, according to the above-described present exemplary embodiment, when the mouse cursor is not present over the thumbnail image, the time on the time axis corresponding to the position of the mouse cursor is set as the reference. Accordingly, the user can also perform designation of a desired time with a simple operation.

When the display range is large, and time corresponding to a length of the time axis on the display area is long, it is difficult for the user to designate time with the mouse cursor. However, when the display range is made smaller, and time corresponding to the length of the time axis on the display area is shortened, it becomes easy for the user to designate time with the mouse cursor. Therefore, according to the above-described present exemplary embodiment, the reference designation modes can be switched. Thus, the user can set the reference in a desired method during the operation by switching between the reference designation modes with a simple operation.

Figure 6:
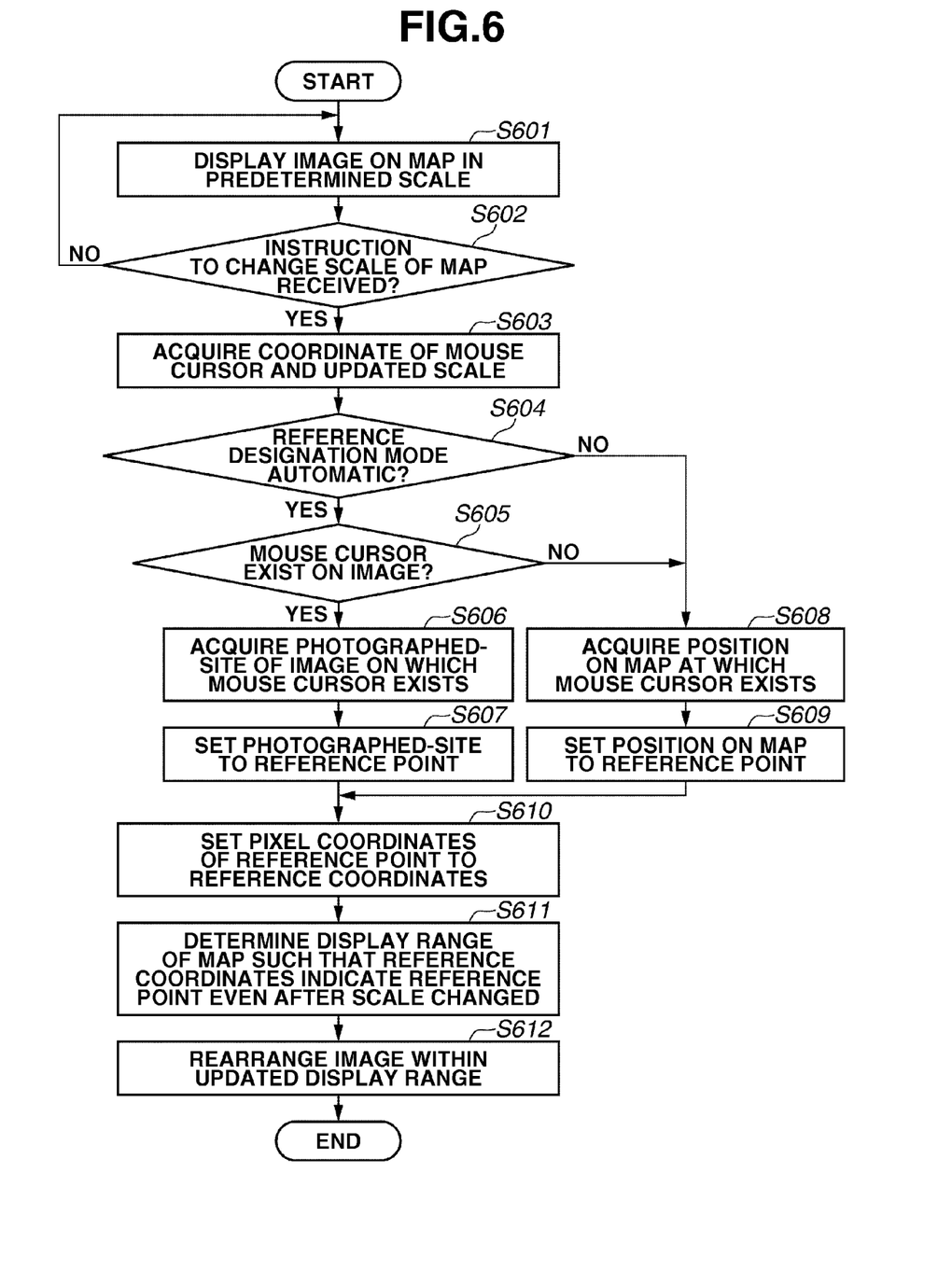
FIG. 6 is a flowchart illustrating an example of an operation of the information processing apparatus according to the exemplary embodiment the present invention.

In a second exemplary embodiment, an operation performed by the information processing apparatus 100 to display an image on a display area (map) having latitude and longitude based on a photo shooting location included in the attribute information thereof will be described with reference to FIG. 6. Descriptions of similar to those in the first exemplary embodiment will not be repeated, and parts peculiar to the present exemplary embodiment will be described in detail below.

The operation is started and realized by the control unit 106 activating an information management application program (hereinafter, information management application) in response to a user's operation, and operating in accordance with the OS and information management application.

First, in step S601, the control unit 106 reads out an image file and information about a map in a predetermined scale from the HDD 109, and displays a thumbnail image of the image file on the display area according to photo shooting location information (latitude and longitude) of the image file. Then, in step S602, the control unit 106 determines whether an instruction to change the scale of the map is received.

If the instruction to change the scale of map is received (YES in step S602), in step S603, the control unit 106 acquires a position of the mouse cursor on the display area and a predetermined updated scale. The predetermined updated scale can be calculated from displacement from start to end points of the drag operation of the mouse cursor. Alternatively, it may be defined in advance that, for example, it will be magnified ten times when the mouse is double clicked. In other words, the updated scale is calculated based on the user's operation content which is detected when the instruction to change the scale of the map is received.

Next in step S604, the control unit 106 determines whether the reference designation mode is automatic. If the mode is determined as automatic (YES in step S604), in step S605, the control unit 106 detects whether a thumbnail image exists at the position of the mouse cursor acquired in step S603 in the display area.

If the mouse cursor exists on the thumbnail image (YES in step S605), in step S606, the control unit 106 acquires a photo shooting location of the image file corresponding to the thumbnail image. Then in step S607, the control unit 106 sets the photo shooting location to a reference point.

On the other hand, if the reference designation mode is not automatic and is manual (NO in step S604), or if the thumbnail image does not exist at the position of the mouse cursor (NO in step S605), in step S608, the control unit 106 acquires a site (latitude and longitude) on the map corresponding to the position of the mouse cursor. Then, in step S609, the control unit 106 sets the site acquired in step S608 as the reference point.

In step S610, the control unit 106 stores pixel coordinates on the display area corresponding to the set reference point as the reference coordinates. Next, in step S611, the control unit 106 determines a display range of the map after a scale changed such that the reference coordinates indicate the reference point on the map of the updated scale, which remains unchanged from that on the map before the update of the scale. In step S612, the control unit 106 rearranges a thumbnail image of the image file having the photo shooting location within a newly determined display range on the map of the updated scale.

Figure 7A:
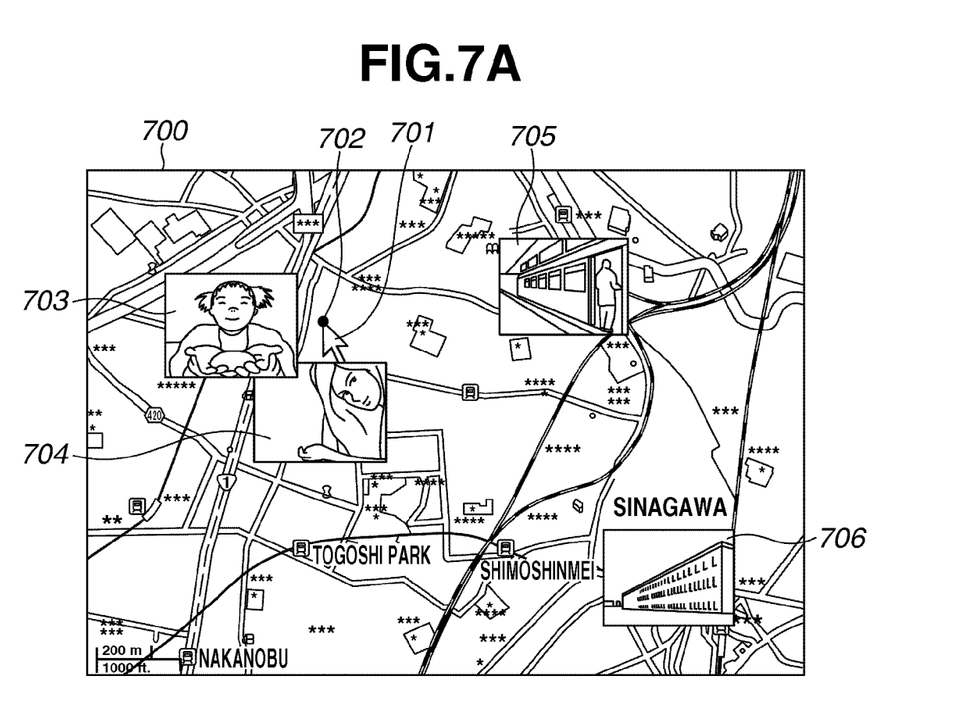
FIGS. 7A and 7B illustrate examples of display areas according to the exemplary embodiment of the present invention.

FIG. 7A illustrates a state when a thumbnail image does not exists at a position of the mouse cursor in step S605, and when the reference designation mode is manual in step S604. In FIG. 7A, the scale of the map is one to ten-thousand, and thumbnail images 703 to 706 are displayed at positions corresponding to photo shooting locations of respective image files. A mouse cursor 701 is present at coordinates which do not overlap with any thumbnail image, and the coordinates is project (35.6160 degrees north latitude and 139.7190 degrees east longitude) on the map.

Figure 7B:
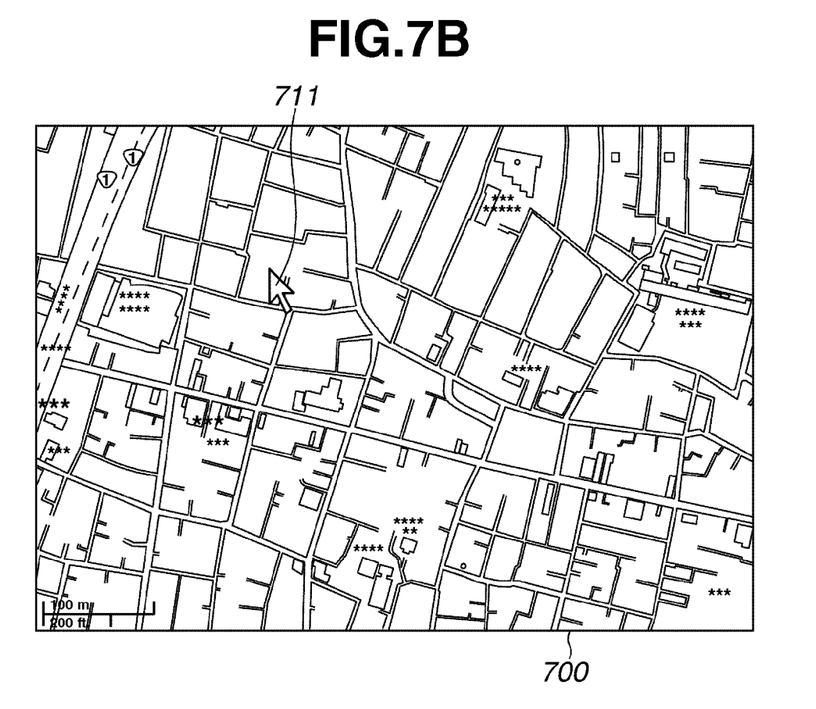

FIG. 7B illustrates a state where the scale of the map is changed from the state in FIG. 7A. In FIG. 7B, since the scale of map is one to five-thousand, and the display range is narrower than that in FIG. 7A, the map is enlarged and displayed. Since the thumbnail images 703 to 706 are not included in the display range after having been changed, they are not displayed.

The coordinates of the mouse cursor 701 in FIG. 7B is projected on the reference point (35.6160 degrees north latitude and 139.7190 degrees east longitude) on the map, and this is the same as the coordinates of the mouse cursor 701 on the map in FIG. 7A. In other words, in step S611, the control unit 106 determines the display range of the map such that the coordinates of the mouse cursor 701 and the corresponding site (latitude and longitude) remain unchanged before and after the change of the display range.

Figure 8A:
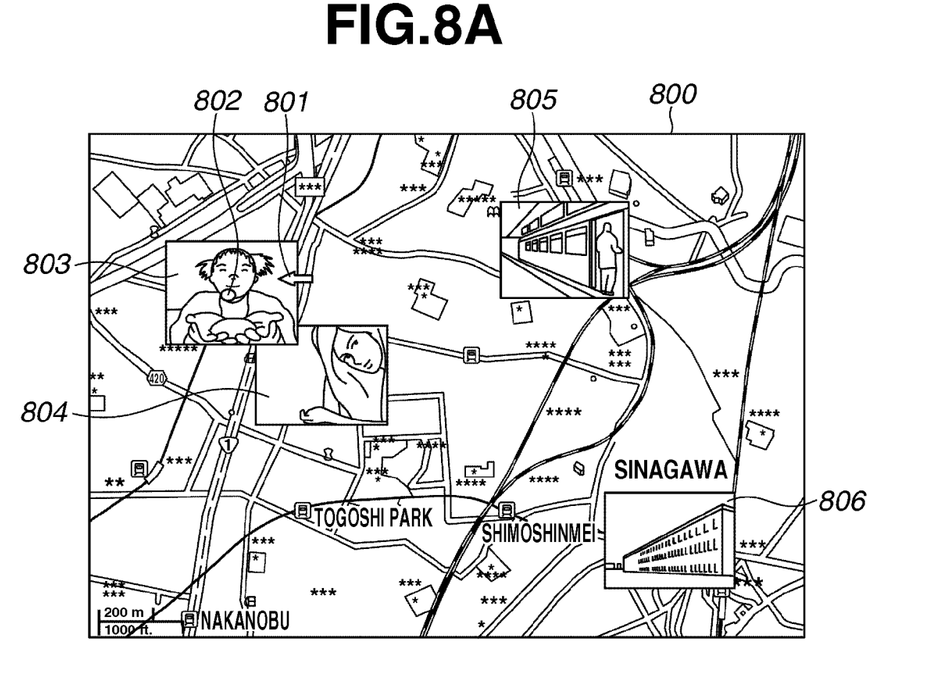
FIGS. 8A and 8B illustrate examples of display areas according to the exemplary embodiment of the present invention.

FIG. 8A illustrates a state when a thumbnail image exists at a position of the mouse cursor in step S605. In FIG. 8A, the scale the map is one to ten-thousand, and thumbnail images 803 to 806 are displayed at positions corresponding to photo shooting locations of image files thereof. Since a mouse cursor 801 exists at a position which overlaps with the thumbnail image 803, the photo shooting location (35.6160 degrees north latitude and 139.7148 degrees east longitude) of the image file corresponding to the thumbnail image 803 is set as the reference point.

Figure 8B:
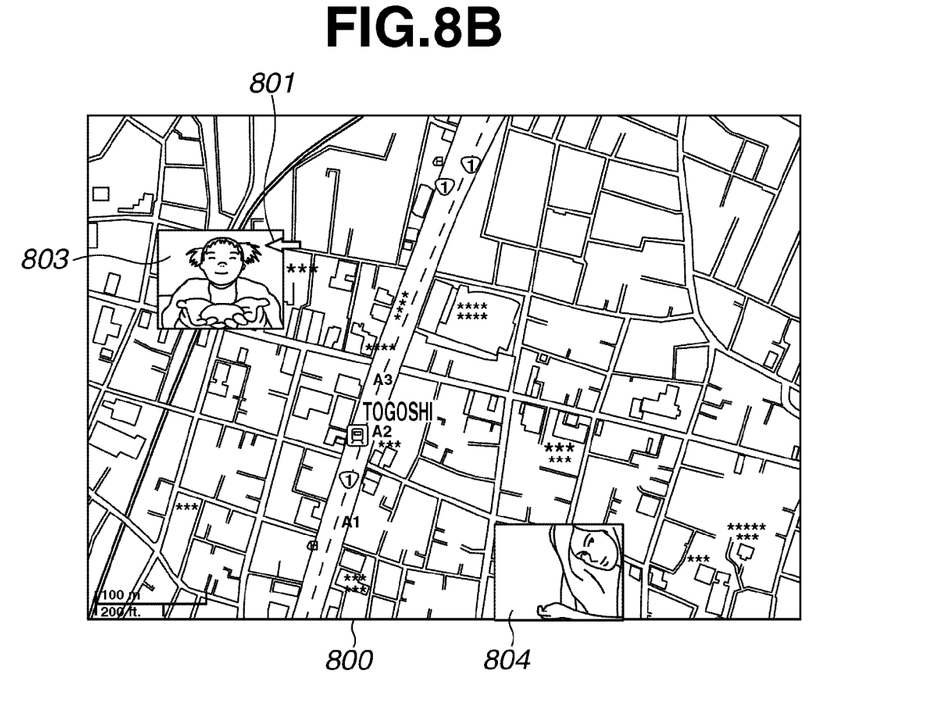

FIG. 8B illustrates a state in which the scale of the map is changed from the state in FIG. 8A. In FIG. 8B, the display range of a display area 800 is one to five-thousand, and the display range is narrower than that in FIG. 8A, the map is enlarged and displayed. The thumbnail images 803 and 804 included in the changed display range are displayed, but the thumbnail images 805 and 806 outside of the display range are not displayed.

The center of gravity of the thumbnail image 803 overlapped with the mouse cursor 801 in FIG. 8B exists at the coordinates of the reference point (35.6160 degrees north latitude and 139.7148 degrees east longitude) on the map, which are the same as the coordinates of the center of gravity of the thumbnail image 803 in FIG. 8A.

More specifically, in step S611, the control unit 106 updates a display range of the map such that the coordinates of the center of gravity of the thumbnail image 803 overlapped with the mouse cursor 801 and the corresponding site remain unchanged before and after the scale of the map is changed. Further, the mouse cursor 801 also maintains a positional relationship with respect to the coordinates within the overlapped thumbnail image 803 before and after the change of the display range. Therefore, the mouse cursor 801 also has pixel coordinates which remain unchanged before and after the display range of the time axis is changed.

In step S611, the control unit 106 determines the display range such that the position of the mouse cursor in the display area remains unchanged before and after the display range is changed. Accordingly, the user does not need to move a viewpoint, and can continue to check an image or a point on which the user focuses before the change. However, how to determine the display range is not limited to the above-described manner. In step S611, the control unit 106 may determine the display range such that the coordinates of the mouse cursor coincide with the center of the display area. Accordingly, the user can make a check centering around the point on which the user focuses.

FIGS. 7A to 8B illustrate how the thumbnail images are displayed such that the coordinates of the center of gravity of each thumbnail image is placed on a position on the map corresponding to the photo shooting location of the image file thereof. However, the method for arranging the thumbnail image on the map is not limited to the above-described manner. The thumbnail image may be displayed display at a position on the map where a left edge or a right edge of the thumbnail image corresponds to the photo shooting time of the image file thereof.

In step S606, if the mouse cursor 501 exists in the area where the plurality of thumbnail images 503 and 504 overlaps with each other as illustrated in FIG. 5, the control unit 106 acquires a photo shooting location of the image file of the thumbnail image 503 which is present on the forefront among the plurality of thumbnail images. Alternatively, the control unit 106 may acquire photo shooting locations of the image files of the respective thumbnail images 503 and 504, and acquire a middle point thereof as the photo shooting location.

A case in which movement of the mouse cursor on the display area is realized by the user's operation of the PD 105 is described above. However, how to move the mouse cursor is not limited to this method. The mouse cursor may be moved by providing a touch panel on the display device 101, and by the user touching the display device 101 with a finger.

If the user moves the mouse cursor over a thumbnail image, the user is likely to focus on the thumbnail image. However, since the thumbnail image is displayed, it is difficult for the user to move the mouse cursor to coordinates on the map corresponding to the photo shooting location thereof.

In view of such situation, according to the above-described present exemplary embodiment, when the mouse cursor is present over the thumbnail image, the photo shooting location of the image file corresponding to the thumbnail image is set as the reference. Accordingly, if the user wants to set a photo shooting location corresponding to a desired thumbnail image as the reference, the user only needs to move the mouse cursor over the thumbnail image. As a result, operation can be easier as compared to moving the mouse cursor exactly to a point corresponding to the photo shooting location.

On the other hand, if the user moves the mouse cursor to a site where the thumbnail image does not exist, the user is likely to be interested in the site itself corresponding to the position of the mouse cursor. Therefore, according to the above-described present exemplary embodiment, when the mouse cursor is not present over the thumbnail image, a site on the map corresponding to the position of the mouse cursor is set as the reference. Accordingly, the user can designate a desired site with a simple operation.

When the display range is large, and the scale on the display area is large, it is difficult for the user to designate a site with the mouse cursor. However, when the display range is made smaller, and the scale on the display area is made smaller, it becomes easier for the user to designate the site with the mouse cursor. Therefore, according to the above-described present exemplary embodiment, the reference designation modes can be switched. Thus, the user can set the reference in a desired method during the operation by switching between the reference designation modes with a simple operation.

Aspects of the present invention may also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-056808 filed Mar. 15, 2011, which is hereby incorporated by reference herein in its entirety.

What is claimed is:

1. An information processing apparatus comprising:
a display unit configured to arrange and display an image on a display area having a time axis according to photo shooting time of the image;
a designation unit configured to designate a point on the display area in response to a user's operation;
an obtaining unit configured to obtain a reference coordinate corresponding to the photo shooting time of the image if the designated point is on the image, or to obtain the reference coordinate which is the same as the designated point if the designated point is not on the image; and
a determining unit configured to determine a display range based on a magnification such that the obtained reference coordinate remains at the same point on the display area before and after a change of the display range,
wherein the display unit rearranges and displays the image within the determined display range on the time axis of the display area according to photo shooting time of the image.

2. The information processing apparatus according to claim 1, wherein the obtaining unit, if a plurality of images is displayed at the designated point, obtains the reference coordinate corresponding to the photo shooting time of an image which is present on a front among the plurality of images.

3. A method for controlling an information processing apparatus, the method comprising:
displaying and rearranging an image on a display area having a time axis according to photo shooting time of the image;
designating a point on the display area in response to a user's operation;
obtaining a reference coordinate corresponding to the photo shooting time of the image if the designated point is on the image, or to obtain the reference coordinate which is the same as the designated point if the designated point is not on the image; and
determining a display range based on a magnification such that the obtained reference coordinate remains at the same point on the display area before and after a change of the display range,
wherein the displaying and rearranging rearranges and displays the image within the determined display range on the time axis of the display area according to photo shooting time of the image.

4. A non-transitory storage medium storing a program causing a computer to execute a method comprising:
displaying an image on a display area having a time axis according to photo shooting time of the image;
designating a point on the display area in response to a user's operation;
obtaining a reference coordinate corresponding to the photo shooting time of the image if the designated point is on the image, or to obtain the reference coordinate which is the same as the designated point if the designated point is not on the image; and
determining a display range based on a magnification such that the obtained reference coordinate remains at the same point on the display area before and after a change of the display range,
wherein the displaying and rearranging rearranges and displays the image within the determined display range on the time axis of the display area according to photo shooting time of the image.

5. An information processing apparatus comprising:
a display unit configured to arrange and display an image on a display area having a time axis according to photo shooting time of the image;
a designation unit configured to designate a point on the display area in response to a user's operation;
an obtaining unit configured to obtain a reference coordinate corresponding to the photo shooting time of the image if the designated point is on the image, or to obtain the reference coordinate which is the same as the designated point if the designated point is not on the image; and
a determining unit configured to determine a display range based on a magnification such that the obtained reference coordinate is a center of the display area after the display range is changed, wherein the display unit rearranges and displays the image within the determined display range on the time axis of the display area according to photo shooting time of the image.

6. A method for controlling an information processing apparatus, the method comprising:

arranging and displaying an image on a display area having a time axis according to photo shooting time of the image;

designating a point on the display area in response to a user's operation;

obtaining a reference coordinate corresponding to the shooting time of the image if the designated point is on the image, or to obtain the reference coordinate which is the same as the designated point if the designated point is not on the image; and determining a display range based on a magnification such that the obtained reference coordinate is a center of the display area after the display range is changed, wherein the arranging and rearranging rearranges and displays the image within the determined display range on the time axis of the display area according to photo shooting time of the image.

7. A non-transitory storage medium storing a program causing a computer to execute a method comprising:

arranging and displaying an image on a display area having a time axis according to photo shooting time of the image;

designating a point on the display area in response to a user's operation;

obtaining a reference coordinate corresponding to the shooting time of the image if the designated point is on the image, or to obtain the reference coordinate which is the same as the designated point if the designated point is not on the image; and determining a display range based on a magnification such that the obtained reference coordinate is a center of the display area after the display range is changed, wherein the arranging and rearranging rearranges and displays the image within the determined display range on the time axis of the display area according to photo shooting time of the image.

* * * * *